Patented Apr. 27, 1937

2,078,278

UNITED STATES PATENT OFFICE 2,078,278

PROCESS OF PRODUCING TITANIUM DIOXIDE

Herbert L. Rhodes, Oakland, Calif., assignor to The Glidden Company, Cleveland, Ohio, a corporation of Ohio No Drawing. Application June 30, 1933, Serial No. 678,477

9 Claims. (Cl. 134—58)

This invention relates to the addition of a titanate to titanium dioxide before calcination and has for its object the production of a titanium dioxide of lower oil absorption, higher opacity and better mixing qualities than the titanium dioxide now available.

I am aware that in the production of titanium dioxide a reagent influences the physical characteristics of the titanium dioxide during calcination. Apparently it does not matter at which stage the reagent is added, as long as it is present during the calcination.

U. S. Patent 1,189,229, page 3, lines 97 to 99 inclusive, describes a mixture of $TiO_2$ and $CaSO_4$.

U. S. Patent 1,171,542, page 3, lines 11 to 16 inclusive, gives the analysis of a titanium oxide mixture before calcination, as follows:

| | |
|---|---|
| Titanic oxide | 65% to 80% |
| Silica | 1% to 5% |
| Iron oxide | 1% to 7% |
| Sodium oxide | 2% to 15% |
| Sulfur, free | 1% to 15% |
| Sulphuric anhydride | 0.1% to 1% |

I am also aware that it has been customary in industrial practice, to add the equivalent of 0.1% to 5% sodium oxide or potassium oxide in the form of sodium or potassium carbonate, to the titanium dioxide content of the product being calcined.

I do not claim any of the above as my invention. I have discovered that a titanium dioxide having lower oil absorption, higher opacity and better mixing qualities than titanium dioxide now produced can be obtained by adding to titanium dioxide, which has been freed of all but approximately one hundredth of one percent of water soluble salts, a titanate which will remain white or light colored after calcination in an amount equivalent to from one-tenth of one percent to two and one-half percent of the titanium dioxide; thoroughly mixing the titanate and titanium dioxide, calcining the mixture, grinding the calcined product in a ball mill and drying.

In practicing my invention I boil a solution of titanium sulphate until a precipitate of titanium dioxide is formed; I thoroughly wash this precipitate with water until the wash water shows the absence of any water soluble salts in quantities higher than approximately one hundredth of one percent. I then reslurry the titanium dioxide in water, adjusting the slurry to about 250 grams of $TiO_2$ per liter; to this mixture I add from .25 to 6.25 grams of barium, strontium, calcium or other titanate of the alkali earth group which will remain white or light colored upon calcination. I filter the slurry dry and calcine. The temperature of calcination depends upon the amount of titanate, the smaller the quantity of titanate used, the higher the temperature required for proper calcination. I have found that when using only one tenth of one percent of titanate the temperature of calcination should be close to 1000° C. and when using 2.5% a temperature as low as 750° C. is sufficiently high.

Now having fully described my invention, I claim:

1. An improvement in the process of producing titanium dioxide which consists of washing a crude titanium dioxide precipitate until all but approximately one hundredth of one percent of soluble salts have been removed, thoroughly mixing with said titanium dioxide a titanate of the alkali earth group which will remain white or light colored after calcination, in an amount equivalent to from one tenth of one percent to two and one-half percent of said titanium dioxide and calcining.

2. An improvement in the process of producing titanium dioxide which consists of washing a crude titanium dioxide precipitate until all but approximately one hundredth of one percent of soluble salts have been removed, thoroughly mixing with said titanium dioxide titanate of barium in an amount equivalent to from one tenth of one percent to two and one-half percent of said titanium dioxide and calcining.

3. An improvement in the process of producing titanium dioxide which consists of washing a crude titanium dioxide precipitate until all but approximately one hundredth of one percent of soluble salts have been removed, thoroughly mixing with said titanium dioxide titanate of calcium in an amount equivalent to from one tenth of one percent to two and one-half percent of said titanium dioxide and calcining.

4. An improvement in the process of producing titanium dioxide which consists of washing a crude titanium dioxide precipitate until all but approximately one hundredth of one percent of soluble salts have been removed, thoroughly mixing with said titanium dioxide titanate of strontium in an amount equivalent to from one tenth of one percent to two and one-half percent of said titanium dioxide and calcining.

5. A pigment consisting of titanium dioxide, and 0.1–2.5% alkali earth titanate, intimately admixed and calcined together.

6. The process of producing pigment titanium dioxide from crude titanium dioxide which comprises calcining the crude oxide with from 0.1 to 2.5% of an alkali earth titanate, in the absence of other diluting pigments.

7. The process of producing pigment titanium dioxide from crude titanium dioxide which comprises calcining the crude oxide with from 0.1 to 2.5% of barium titanate in the absence of other diluting pigments.

8. The process of producing pigment titanium dioxide from crude titanium dioxide which comprises calcining the crude oxide with from 0.1 to 2.5% of calcium titanate in the absence of other diluting pigments.

9. The process of producing pigment titanium dioxide from crude titanium dioxide which comprises calcining the crude oxide with from 0.1 to 2.5% of strontium titanate in the absence of other diluting pigments.

HERBERT L. RHODES.